United States Patent [19]

Legast

[11] 4,319,963

[45] Mar. 16, 1982

[54] APPARATUS FOR THE STEAM EXTRACTION OF ESSENTIAL OILS FROM VEGETABLE MATERIAL

[76] Inventor: Etienne Legast, Chemin A. Jeandin, 22/8011, Thonex, Geneva, Switzerland

[21] Appl. No.: 217,034

[22] Filed: Dec. 16, 1980

[30] Foreign Application Priority Data

Jan. 7, 1980 [CH] Switzerland ............................ 57/80

[51] Int. Cl.³ ............................................ B01D 3/38

[52] U.S. Cl. ...................................... 202/170; 99/293; 422/289

[58] Field of Search ............... 202/170, 168, 169, 234; 203/95, 96; 99/288, 293; 422/255, 280, 285, 288, 289

[56] References Cited

U.S. PATENT DOCUMENTS 864,208 8/1907 Stevens et al. ....................... 202/170

1,424,248 8/1922 Jordon ............................... 202/170

*Primary Examiner*—Frank Sever

*Attorney, Agent, or Firm*—Emory L. Groff, Jr.

[57] ABSTRACT

An extraction enclosure is connected by a pipe in its upper region to a source of steam. A drawer having a grill base for containing vegetable materials to be extracted permits the introduction of vegetable materials into the extraction enclosure. The base of this latter enclosure communicates with a subjacent refrigerated or cooling enclosure, provided with discharge means.

There is thus avoided or minimized risk of overheating and/or of the hydrolysis of the essential oil in the course of extraction and there is eliminated or minimized all obstacles of flux of vapors and of liquid at the refrigerant level. The charging and discharging of the extraction enclosure are also simplified.

7 Claims, 2 Drawing Figures

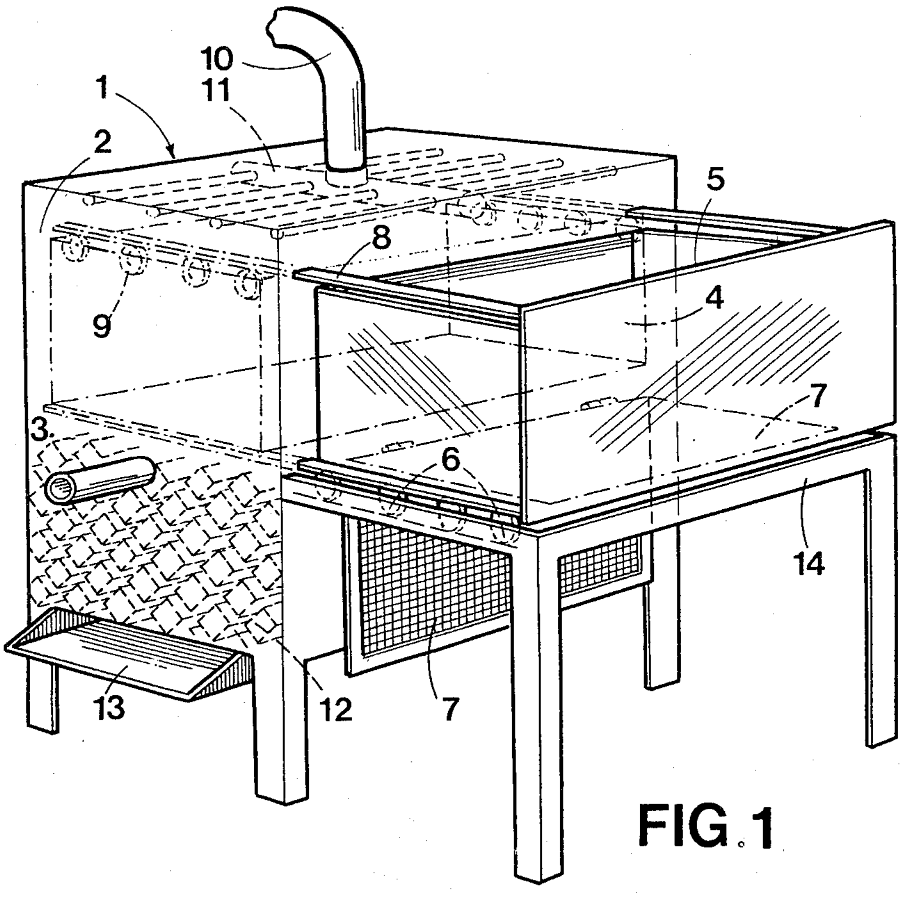
FIG. 1
FIG. 2
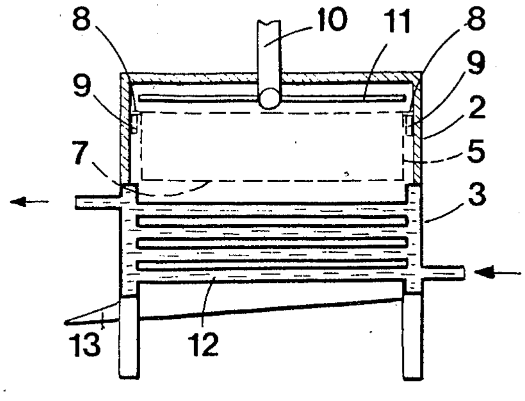

APPARATUS FOR THE STEAM EXTRACTION OF ESSENTIAL OILS FROM VEGETABLE MATERIAL

The present invention relates to a process and apparatus for the steam extraction of essential oil from vegetable material.

The usual known process consists in directing steam through the material from the bottom to the top and subsequently condensing the mixture of steam and oil emitted above the vegetable material in a refrigerant.

This process has the disadvantage of giving rise to condensation of water in the vegetable material with localized squeezing or consolidation of this matter, creation of steam channels in other areas and hydrolysis affecting the quality of the essential oil.

According to the present invention there is provided a process for steam extraction of the essential oil from a vegetable material, characterized in that in an extraction enclosure steam is directed over the said material from the top to the bottom and wherein the extraction enclosure is in communication with a refrigerated or cooling enclosure provided below the extracting enclosure, and in that the condensate formed of essential oil and water is recovered at the bottom of the said refrigerated or cooling enclosure.

Conventional known installations for steam extraction of vegetable essences comprise stills having swannecks which are connected to a refrigeration device. The vegetable materials to be treated are generally introduced from the top and disposed on a grill provided inside this apparatus. Alternatively, the materials can be disposed in a basket which is suspended inside the still. After closure of the apparatus steam is injected under pressure below the grill or the base of the basket. After condensation in the refrigeration device, the mixture of water and essential oil is recovered in a decanting recipient separating the essential oil from the water.

These known installations present, in addition to the disadvantages mentioned above, the risk of damaging the vegetable material by overheating during the pressure of steam from the bottom to the top in the still. After exhaustion of the vegetable material, it is necessary to open the apparatus to withdraw the material which results in losses in time and in heat.

Also according to the present invention there is provided an apparatus for extracting oil from vegetable matter comprising passing steam from top to bottom over said material in an enclosure and subsequently condensing oil and water therebelow and recovering such comprising an extraction enclosure connected to a source of steam and to a refrigerated or cooling enclosure, characterized in that steam inlet means is provided at the top of the extraction enclosure and the extraction enclosure is in communication in its base region with the refrigerated or cooling enclosure.

The invention will be described further, by way of example, with reference to the accompanying schematic drawings, in which:

FIG. 1 is a perspective view of one embodiment of an apparatus for putting the process of the invention into practice but with parts removed; and FIG. 2 is a partial cross-sectional view of the apparatus of FIG. 1.

The apparatus represented in the drawing comprises a parallelepipedical enclosure 1 divided into two superposed compartments 2, 3, communicating one with the other. The upper compartment 2 has an opening 4 in one of its vertical walls by means of which there may be introduced a drawer 5, loaded with vegetable material from which it is desired to extract the essential oils. The drawer 5 is mounted on rollers 6 which have a support 14 adjacent the compartment 2 of the enclosure 1. The base of the drawer 5 is constituted by a grill 7 and the drawer 5 also has an edge 8 along its upper edge permitting its engagement by the rollers 9 when it is introduced into the compartment 2 of the enclosure 1.

Steam under pressure is introduced into the top of the compartment 2 through a tube 10 and traverses from top to bottom the vegetable material contained in the drawer 5. A distributor 11 formed by perforated tubes connected directly or indirectly on the tube 10 extends at a right angle with respect to the tube 10 and is provided with perforations orientated towards the base of the compartment 2, thus ensuring an equal distribution of steam over the vegetable material contained in the drawer 5.

The mixture of steam and essential oil extracted from the vegetable material subsequently passes through the grill 7 constituting the base of the drawer 5 and into the compartment 3 of the enclosure 1. This compartment 3 is traversed by tubes 12 connected to a source of cold water, adapted to condense the mixture of steam and essential oil. The condensate is recovered at the base of the refrigerated or cooled compartment 3 in a discharge means 13 and the essential oil can be separated from the water, in a manner known per se.

The refrigerating or cooling tubes 12 are preferably of polygonyl cross-section—especially of square or hexagonal cross-section—so as to present maximum surface contact to the steam charged with essence to be condensed.

The grill 7 constituting the base of the drawer 5 is preferably pivoted along the lower edge of one of its vertical walls, so as to be able to be lowered when the carriage is withdrawn from the enclosure in a manner to accelerate the discharge of the exhausted or used up vegetable material.

Preferably, the base of the refrigerated compartment 3 is inclined and communicates with the discharge means 13 located at the base and extending substantially over the whole of the width of one of its walls in a manner to avoid or minimize all obstacles, throttling or eddies in the flux of the condensate at the outlet of the refrigerated compartment. The condensate of essential oil and water is recovered in a gutter (not shown) and directed towards a decanting device.

Amongst the particular advantages of the apparatus described, it is to be noted the elimination of the throttling during the passage of vapours and liquid from the extraction enclosure into the refrigerated or cooling enclosure and of this latter towards the collector adapted to direct the condensate towards the decanting device. There results a notable acceleration in the extraction process of essential oil. Also the risk of hydrolysis of this latter is substantially reduced, resulting in an improvement in the quality of the essential oil produced.

In the case where the vegetable material to be extracted comprises fine particles such as pollen or other pulverulent material, the grill 7 can be covered with fibres or a cloth for retaining fine material.

I claim:

1. Apparatus for extracting oils from vegetable material comprising an enclosure including top, bottom and side walls, one of said side walls provided with an opening in the upper portion thereof, means to facilitate charging and emptying of said vegetable material while minimizing loss of heat, including a drawer for containing said vegetable matter, said drawer having side walls, an open top and a perforated bottom, said drawer insertable into and out of said enclosure through said side wall opening, first means outside of said enclosure and adjacent the lower edge of said opening for supporting said drawer for loading and unloading of said vegetable material, second means inside of said enclosure for supporting said drawer when it is moved through said side wall opening into said enclosure for treatment of said vegetable material, a source of steam connected to the top wall of said enclosure above the area occupied by said drawer containing vegetable material and directing steam downwardly over said material, a cooling and condensing compartment in said enclosure beneath the area occupied by said drawer and means for collecting the extracted oils at the bottom of the cooling compartment.

2. Apparatus according to claim 1, wherein the cooling enclosure comprises tubes of polygonal cross-section to be traversed by a refrigerating or cooling liquid.

3. Apparatus according to claim 2, wherein the tubes of the cooling enclosure are of square cross-section disposed in staggered configuration, substantially parallel to the base of the refrigerated enclosure.

4. Apparatus according to claim 3, wherein said extraction enclosure and the cooling enclosure are of parallelepipedical form.

5. Apparatus according to claim 4 wherein, the admission of steam to said extraction enclosure is effected by means of a pipe and a perforated distributor connected to said pipe provided in the top region of the extraction enclosure where the vegetable material is to be contained.

6. Apparatus according to claim 4, wherein the bottom of the cooling enclosure is inclined and connected to discharge means extending substantially over the whole width of one of the walls of said enclosure, at the bottom end thereof.

7. Apparatus according to claim 1 wherein, the perforated bottom of said drawer is hinged to one of said drawer side walls to facilitate removal of the treated vegetable material.

* * * * *